July 20, 1937.                R. J. NORTON                2,087,386
                              BRAKE INDICATOR
                           Filed Sept. 20, 1930
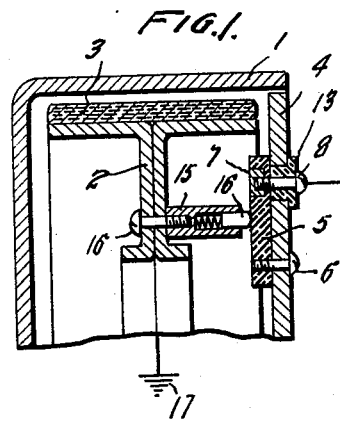
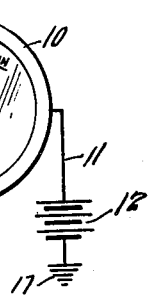
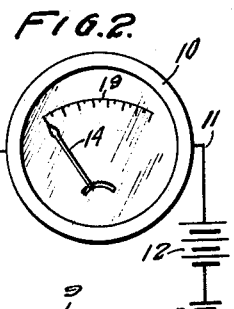
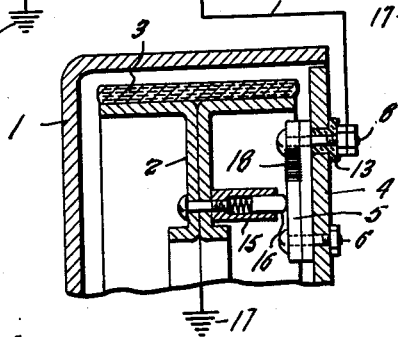
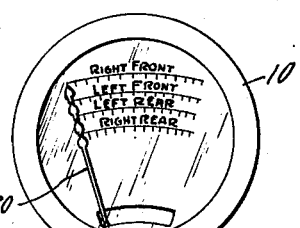
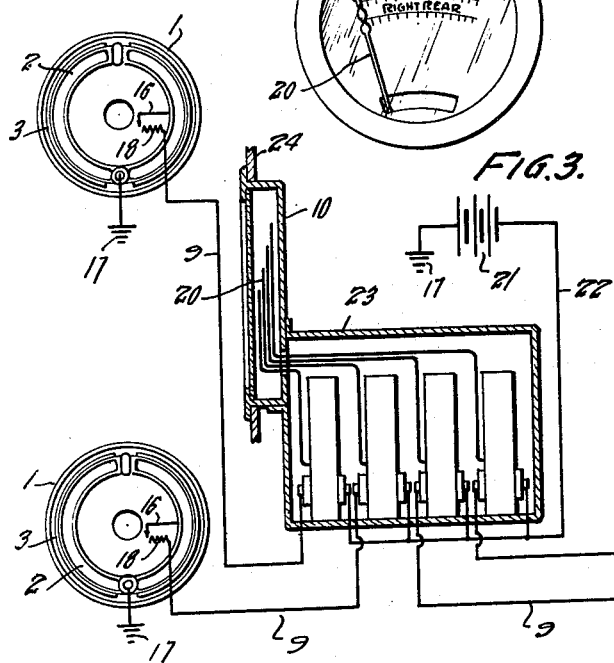
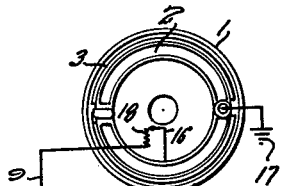
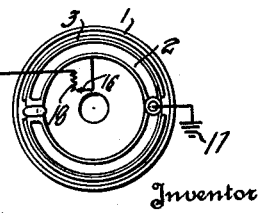
Inventor
RAYMOND J. NORTON
M W McConkey
By Semmes & Semmes
Attorneys Patented July 20, 1937

2,087,386

UNITED STATES PATENT OFFICE 2,087,386

BRAKE INDICATOR

Raymond J. Norton, Washington, D. C., assignor to Bendix Brake Company, South Bend, Ind., a corporation of Illinois Application September 20, 1930, Serial No. 483,355

2 Claims. (Cl. 177—311)

This invention relates to indicating mechanism for brakes.

The ordinary brake mechanism comprises a rotating drum and cooperating internal expanding non-rotating shoe. To increase the retardation effect the friction material is interposed between the rotating and non-rotating parts and in most cases is fixed to the shoe. Considered from the standpoint of safety the brake mechanism is perhaps the most important structure on an automotive vehicle. It is, therefore, important to know the condition of the brake lining because this factor in a large measure determines the efficiency of the brake. When the brake lining is worn down to an undesirable thinness it becomes a potential danger inasmuch as it may suddenly shear away from the shoe and thus greatly decrease the brake efficiency. Furthermore, when the brake lining becomes worn down to a predetermined degree the metallic securing means, upon brake application, contacts with the drum. In this circumstance due to the fact that the drum is a low carbon steel it rapidly becomes scarified and requires replacement.

Heretofore the estimation of the condition of the brake lining has been a matter of mere chance. The present invention consists broadly of the idea of the provision of means to indicate the condition of wear of the brake band.

The main object of the present invention, therefore, is to provide an instrument for indicating the condition of the brakes.

Another object is to provide a dash board indicator adapted to show the condition of wear of the brake band.

Another object is to provide an indicator positioned in a readily available place to show the condition of the brakes.

Another object is to provide an optical indicator to show the condition of all of the brakes on an automotive vehicle.

With these and other equally important objects in view the invention comprehends the concept of associating with one or more of the brakes of a vehicle an indicator, preferably an electrical indicator, which shows the condition of wear of the brake lining.

In order to render the invention more readily comprehensible specific embodiments of it are shown in the accompanying drawing in which Figure 1 is a diagrammatic illustration of one form of the invention;

Figure 2 is a similar illustration of a modified form;

Figure 3 is a circuit diagram showing the relationship of the indicating means to the brakes on the vehicle and Figure 4 is a detailed showing of the dial of the indicating instrument.

As indicated above, the object of the invention is to provide an indicator for showing the extent of the wear of the brake linings. This may be done by positioning an indicator upon the dash board and operating this by means of the relative displacement of the brake shoe. The displacement of the latter, upon application of the brakes, depends upon the extent to which the lining has worn down. While there are a number of methods of showing such displacement the preferred embodiment selected for illustration involves the use of an electrical current.

As shown in the drawing and particularly in Figure 1, the apparatus may comprise the brake drum 1, of any conventional form, with which is associated the non-rotating expansion shoes 2. Affixed to the shoe is a lining 3. The drum is sealed off, against the admission of dust and water by the backing plate 4.

When such brakes are applied the shoe 2 is moved outwardly so that the frictionally engaging surface of the lining 3 contacts with the braking flange on the drum. As the lining is worn down it is necessary to move the shoe a greater distance outwardly to insure this frictional contact. In the present invention use is made of this differential distance resulting from wear on the lining to indicate such condition of wear. As shown in Figure 1 this may be done by placing on the backing plate 4, a strip of dielectric material 5. This may be secured to the backing plate in any desired manner as by the screw 6. At a predetermined point on the dielectric plate there is provided a metallic contact 7, which is connected through the stud 8 to a conductor 9. This conductor is connected at one terminal to a galvanometer indicator 10. The other terminal of the indicator is connected through the conductor 11 and source of current 12, to the ground. The source of current may be a small battery supplying only sufficient current to operate the instrument. If desired the current may be taken from the storage battery of the car. The electrical conductor 8 is suitably insulated from the backing plate by the insulated bushing 13.

As will be appreciated the purpose of the foregoing apparatus is to provide for the establishment of an electrical circuit when contact is made through the contact 7. When such contact is established this factor is indicated by deflection of the needle 14 on the instrument.

A simple method of establishing such circuit comprises providing a metallic conductor on the brake shoe so positioned and arranged as to make contact with the member 7 when the lining is worn down beyond the predetermined safe degree. The apparatus as shown in Figure 1 may comprise a sleeve 15 of suitable conductive material which is connected at one end, through the intermediacy of the screw 16, to the shoe and which at its other end receives the spring pressed contact plunger 16. This metallic plunger is grounded at 17.

The operation of this structure will have been appreciated from the foregoing description. During the normal operation, and when the brake lining is in good condition, that is to say is relatively thick, the shoe is moved outwardly towards the braking flange and the plunger 16 rides only on the insulated section of the member 5. However, as the lining becomes worn down the member 16 moves progressively outwards and finally contacts with the member 7. This closes the electrical circuit, and operates the pointer 14. The pointer is thrown over to the opposite side of the dial to the section marked "thin" thus showing that the lining has been worn down so thin that replacement is desirable in order first to insure efficiency of braking and second to prevent scarification of the drum.

The embodiment of the invention previously described indicates only two conditions, that is to say a good condition and a poor condition of the brake lining. If desired, the progressive diminution in the thickness of the lining may be indicated. This may effectively be done by inserting the resistance 18 in the circuit. This may comprise a continuous helical resistance as shown in Figure 2. The dial of the indicator is calibrated as shown at 19. Any point which corresponds to the relative diminution in the thickness in the lining, or other elements of the circuit are substantially the same. The backing plate is provided with the insulated plate 5, upon one portion of which is formed the continuous resistance 19. At one end this resistance is connected through the conductor 8 to the conductor 9. The conductor 8 is fitted into the bushing 13. Similar to the structure shown in Figure 1, the brake shoe of the present modification is provided with the contact assemblage 15 and 16 and is grounded at 17.

During the early steps of the operation of the brake, the plunger 16 will ride upon the insulated portion of the plate 5. As the lining becomes worn down, however, the plunger will contact with one end of the continuous resistance 18. In this circumstance the current flows through the entire resistance and the needle is deflected the minimum amount. However, as the lining wears down the resistance will be increasingly cut out so as to insure a greater deflection of the needle.

If desired also the relative condition of the four brakes of the vehicle may likewise be indicated. Such a structure is shown in Figures 3 and 4. In this arrangement the indicator is provided with four pointers 19, which cooperate with sections of the dial corresponding respectively to the four wheels of the vehicle. Each one of the brakes of the vehicle may be provided with an associated galvanometer one terminal of each of which is connected to the common current source 20 through the conductor 21. The other terminals of these galvanometers are connected to their respective brakes through the resistance 18. The operation of this form of the invention is substantially the same as that of the device shown in Figure 2 except that upon application of the brakes a simultaneous reading for all four of the wheels is obtained. The galvanometers may be enclosed in any suitable casing 22 and positioned adjacent the dash. The indicator 10 may be suitably mounted on the dash 23.

It will be seen that by the employment of a mechanism of the type described the relative condition of the brakes on any one, or all of the wheels of a vehicle may be indicated to the driver during the operation of the car and will disclose the necessity of replacement of the brake linings before the thickness of such linings are dangerously reduced.

While specific embodiments have been shown it will be understood that these are given merely as examples as it will be appreciated that other particular mechanisms may be employed. Thus, in lieu of the electrical arrangement other mechanical or hydraulic devices may be employed to indicate and/or measure the wear on the linings and to this extent show the relative condition of the brakes.

I claim:

1. An internal brake comprising a rotating drum, a stationary backing plate, a relatively non-rotating brake shoe mounted on said backing plate and having a friction lining and adapted to be moved into and out of engagement with said drum, a pair of contacts radially spaced and carried by said plate and shoe respectively and housed within said drum and backing plate and adapted to electrically contact upon movement of said shoe relative to said plate to an abnormal extent due to worn friction lining, and an electrical indicating circuit connected to said contacts.

2. An internal brake comprising a rotating drum, a stationary backing plate, a relatively non-rotating brake shoe mounted on said backing plate and having a friction lining and adapted to be moved into and out of engagement with said drum, a resistor and sliding brush carried by said plate and shoe and arranged for relative movement and housed within said drum and backing plate, an indicating circuit and source of electrical energy connected with said resistor and brush, whereby the indicating circuit may be directly affected by relative radial movement of said shoe and plate, said brush being adapted to slide clear of said resistor when said brake shoe is in released position to open said electrical circuit.

RAYMOND J. NORTON.